United States Patent [19]

Holtz

[11] Patent Number: 4,471,744
[45] Date of Patent: Sep. 18, 1984

[54] PROCESS AND UNIT FOR OPERATING A COMBUSTION ENGINE ABOARD SHIPS

[76] Inventor: Gustav F. Holtz, Seiffertstr. 36, 2800 Bremen 33, Fed. Rep. of Germany

[21] Appl. No.: 311,215

[22] Filed: Oct. 14, 1981

[30] Foreign Application Priority Data

Oct. 16, 1980 [DE] Fed. Rep. of Germany ....... 3039039

[51] Int. Cl.³ .................... F02M 37/00; F02M 53/02
[52] U.S. Cl. .................................. 123/514; 123/515; 123/575; 123/577; 123/557; 123/304
[58] Field of Search ............... 123/575, 577, 515, 514, 123/304, 1 A, 557

[56] References Cited

U.S. PATENT DOCUMENTS

| | | | |
|---|---|---|---|
| 1,308,917 | 7/1919 | Ricketts | 123/575 |
| 1,346,477 | 7/1920 | Anderson et al. | 123/575 |
| 2,311,828 | 2/1943 | Hansen et al. | 123/575 |
| 2,599,699 | 6/1952 | Dilworth et al. | 123/514 |
| 2,758,579 | 8/1956 | Pinotti | 123/577 |
| 2,865,345 | 12/1958 | Hilton | 123/575 |
| 2,984,229 | 5/1961 | Vaughan | 123/575 |
| 3,022,425 | 2/1962 | Rockstead | 123/515 |
| 4,321,905 | 3/1982 | Kurasawa | 123/575 |

*Primary Examiner*—Ethel R. Cross
*Attorney, Agent, or Firm*—Wolder, Gross & Yavner

[57] ABSTRACT

A process for the preparation of a diesel oil—heavy oil mixture for use as an engine fuel includes the steps combining the two oils proximate the engine, heating the mixture to obtain the required overall fuel viscosity and continuously supplying the heated mixture to the engine for injection into the cylinders. Unused, heated fuel is continuously recirculated to maintain the availability of fuel at the proper viscosity.

4 Claims, 1 Drawing Figure

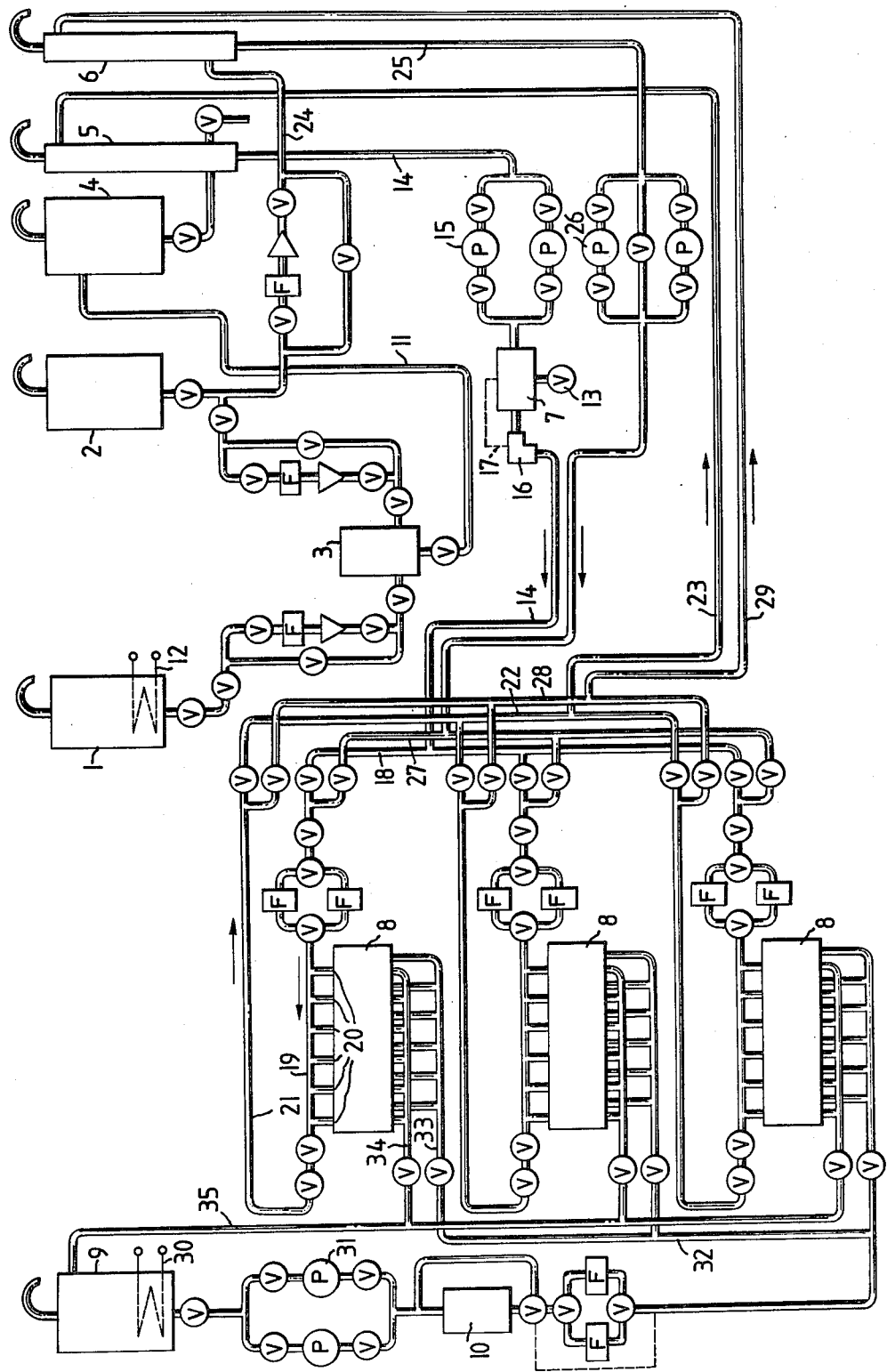

PROCESS AND UNIT FOR OPERATING A COMBUSTION ENGINE ABOARD SHIPS

The invention relates to a process for operating a combustion engine, especially an accessory drive diesel engine or an intermediate rotor diesel engine serving as the main drive aboard ships, with a mixture of diesel oil and heavy oil, in which the mixed oil is forwarded to the combustion engine and is injected there.

The injection of a mixture of heavy oil and diesel oil (gas oil) as a fuel to accessory drive combustion engines always present aboard a ship is known. In many ships in which intermediate rotor diesel engines are installed as the main machines for space-saving reasons, attempts are also known for operating these intermediate rotor diesel engines with a mixture of heavy oil and diesel oil which was previously mixed in a refinery. As heavy oil is substantially cheaper than diesel oil, it is possible to achieve a considerable saving in costs in this way in the operation of the accessory drives mainly used to produce current or the intermediate rotor diesel engines introduced as main drive machines. In the case of the hitherto customary operation of accessory drive machines or the intermediate rotor diesel engines with such a mixed oil, however, difficulties have arisen because these combustion engines are very sensitive to deviations in the consistency of the mixed oil from the prescribed value, to which they react, which frequently leads to disorders and stoppages of these drives.

This danger of such failures is understandably all the greater the higher the component to heavy oil in the mixed oil is. Naturally, however, a high component of heavy oil is desired. In practice, however, it is not possible to attain the theoretically possible component of 35 heavy oil because, in consideration of the above mentioned difficulties, the mixed oil obtained from the refinery in a finished mixture must have a smaller heavy oil component.

In addition, accessory drive ship diesel engines cannot be operated with mixed oil free from supervision, thus not automatically. The output demanded of the accessory drives constantly changes in function of the load, so that the fuel requirement varies correspondingly. It is consequently necessary to see to it that the fuel supplied to the accessory diesel engines is available at the necessary consistency and that the mixed oil is suitably pretreated, especially by preheating.

The goal of the invention is consequently that of providing an operating process as well as a unit suitable for its execution by means of which the automatic operation of such accessory diesel engines as well as intermediate rotor main drives aboard ship is also possible without disturbances with the use of mixed oil. To achieve this goal, it is technically provided in accordance with the invention for the mixed oil to be heated up to the temperature corresponding to a certain viscosity during it passage, and uninjected excess oil is returned to the beginning of the forwarding.

In this way, circulating hot mixed oil of the correct consistency is always available at the injection nozzles of the accessory diesel engines, even when the accessory diesel engine is off. It is to be borne in mind that several such accessory drive combustion engines are generally provided aboard a ship, one of which, for example, is always running, possibly with changing load, while others are turned on as required. According to the new operating conditions, mixed oil of the required consistency (viscosity) now constantly circulates and is available from the first revolution of a hitherto standing accessory diesel engine. It is also advantageous that a rapid change in load does not act on the preheating of the mixed oil in the same way, because a greater quantity of mixed oil constantly runs through the forwarding and return lines as well as the heater than is necessary in each case, so that a sudden switching off of an accessory diesel engine requires neither a sudden reduction in the preheating heat output nor the danger of an overheating of the mixed oil. Correspondingly, the restarting of an accessory diesel engine does not require a sudden raising of the heating perfomance; in particular, however, there is no danger that in this case mixed oil of unsuitable viscosity will first be injected and consequently lead to operating disturbances.

According to a further designing of this operating process, the diesel oil and preheated heavy oil are mixed in a certain ratio only shortly before forwarding. In this way, it is possible to additionally adjust the mixture ratio of the mixed oil components to the requirements of the accessory diesel engines in a short time. In continuous operation, consequently, especially if the accessory diesel engines are operating under high load, it is possible to work with a higher component of heavy oil, so that the savings possible with the introduction of heavy oil are completely utilized.

A unit for execution of the process described above with at least one forwarding pump for the mixed oil, which it draws from a storage tank and forwards to the injection nozzles of the combustion engine, is characterized in accordance with the invention by the fact that the forwarding pump has its own drive, that a viscosity-controlled heater is contained in the mixed-oil line to the injection nozzles, and that a return line is provided from the injection nozzles to the storage tank.

In the case of known accessory diesel units aboard ships, the fuel feed pumps are located at the discharge from the machine in each case and consequently can only feed when the machine is running. In its turn, this leads to the situation in which at first mixed oil of incorrect viscosity is forwarded to the machine, and operating disturbances are rapidly produced which can be eliminated only at considerable expense.

The heater is preferably of multistage design and is connected to a viscosity sensing element arranged on the discharge side. In this way, the heating output can rapidly and precisely be adjusted to the requirement in each case, namely the preparation of the quantity of mixed oil necessary in each case for the operation of the accessory diesle engine of suitable viscosity.

According to a further design of the process, moreover, separate storage tanks are provided for heavy oil and diesel oil, to which a mixer is connected, which prepares the mixed oil in a selectable mixing ratio and forwards it to the mixed oil storage tank. As already explained above in connection with the process, the heavy-oil portion of the mixed oil can thereby be varied in a short time so that as high as possible a component of heavy oil is introduced in all cases.

The drawing illustrates a form of execution of the invention for a schematic representation with three accessory diesel engines.

Storage tank 1 for heavy oil and storage tank 2 for diesel oil are attached to mixer 3, in all cases by way of the necessary fittings such as valves, filters, etc.

Their outlet line 11 leads to storage tank 4 for the mixed oil. Preliminary heater 12 is arranged in storage tank 1 for the heavy oil; it heats the heavy oil up to about 70° C. before its feeding to mixer 3.

Equalizing pipe 5 is attached to storage tank 4. Forwarding line 14 leads from the former to forwarding pump 15, to which a pump of the same kind is attached in parallel for reasons of safety.

Multistage heater 7, on whose discharge side viscosity sensing element 16 is arranged, is located in the forwarding device behind forwarding pump 15, which adapts the heating output of heater 7 to the requirements in each case by means of control line 17, so that the viscosity of the mixed oil in forwarding feed line 14 always remains the same. In addition, sludge discharge 13 is provided at heater 7.

Feed line 14 divides in distributor 18, from which connection lines 19 lead by way of valves and filters for the only indicated injection nozzles 20 of the accessory drive diesel engines 8. Connection lines 19 continue into return lines 21, which conduct excess mixed oil by way of return distributor 22 into return line 23, which is attached to equalizing pipe 5; the circulation cycle of the mixed oil is closed thereby.

It is possible to set up a pure diesel oil circulation instead of the mixed circulation by controlling suitable valves. It leads from the diesel oil storage tank 2 through line 24 again provided with the usual fitting and another equalizing pipe 6 to feed line 25. Feed pumps 26 in it forward the diesel oil into distributor 27. Form there, it passes through connection lines 19 to injection nozzles 20 or by way of lines 21 and collector 28 into return line 29, which returns to equalizing pipe 6.

It should also be explained that a cooling system for the injection nozzles is schematically represented at the left in the drawing. Cooling oil, if necessary heated by preheater 30 at the beginning of the operation, flows from storage tank 9 through forwarding pumps 31 into oil cooler 10 and passes from it through distributor 32 into cooling first runnings 33. Returns 34 empty into collector 35, which for its part is again connected to storage tank 9.

The invention can also be applied in the case of intermediate rotor main drive machines instead of accessory diesel engines, whose heavy oil-diesel oil mixture is regulated by means of forwarding pump 15 with respect to its consistency, to which multistage heater 7 and discharge-side viscosity sensing element 16 are connected on the discharge side of forwarding pump 15.

I claim:

1. A method of feeding a fuel mixture of diesel oil and heavy oil of a predetermined ratio from a fuel mixture vessel to a combustion engine for injection therein, comprising permanently and continuously recirculating the excess fuel mixture in a closed path back to the fuel mixture vessel both at engine running and cutoff, regulating the viscosity of said fuel mixture to a predetermined value by measuring the viscosity of the mixture shortly upstream of the point of withdrawal from the closed loop for injection into the engine and by heating the fuel mixture correspondingly and independently of the operation of the engine, and starting and running the combustion engine with the circulating fuel mixture.

2. A system for conditioning and feeding a predetermined diesel oil-heavy oil fuel mixture to a combustion engine, comprising a closed circuit conduit network including a fuel mixture vessel, input means for feeding said fuel mixture into said vessel, output means for withdrawing said fuel mixture from said network and feeding it to said engine, a pump operable independently form the operation of said engine located in said network for recirculating said fuel mixture through said network during both engine running and cutoff, a heater energizable independently of said engine for heating said recirculating fuel mixture, viscosity sensing means located shortly downstream of said heater, and means operably connected to said heater and viscosity sensing means for controlling said heater in response to the output of said sensing means.

3. The system of claim 2 wherein said heater is a multistage heater.

4. The system of claim 2 wherein said input means includes a first tank for storing diesel oil, a second tank for storing heavy oil, and means for withdrawing and mixing said diesel oil and heavy oil from said tanks in predetermined proportions and introducing the mixture into said vessel.

* * * * *